Figure 1:
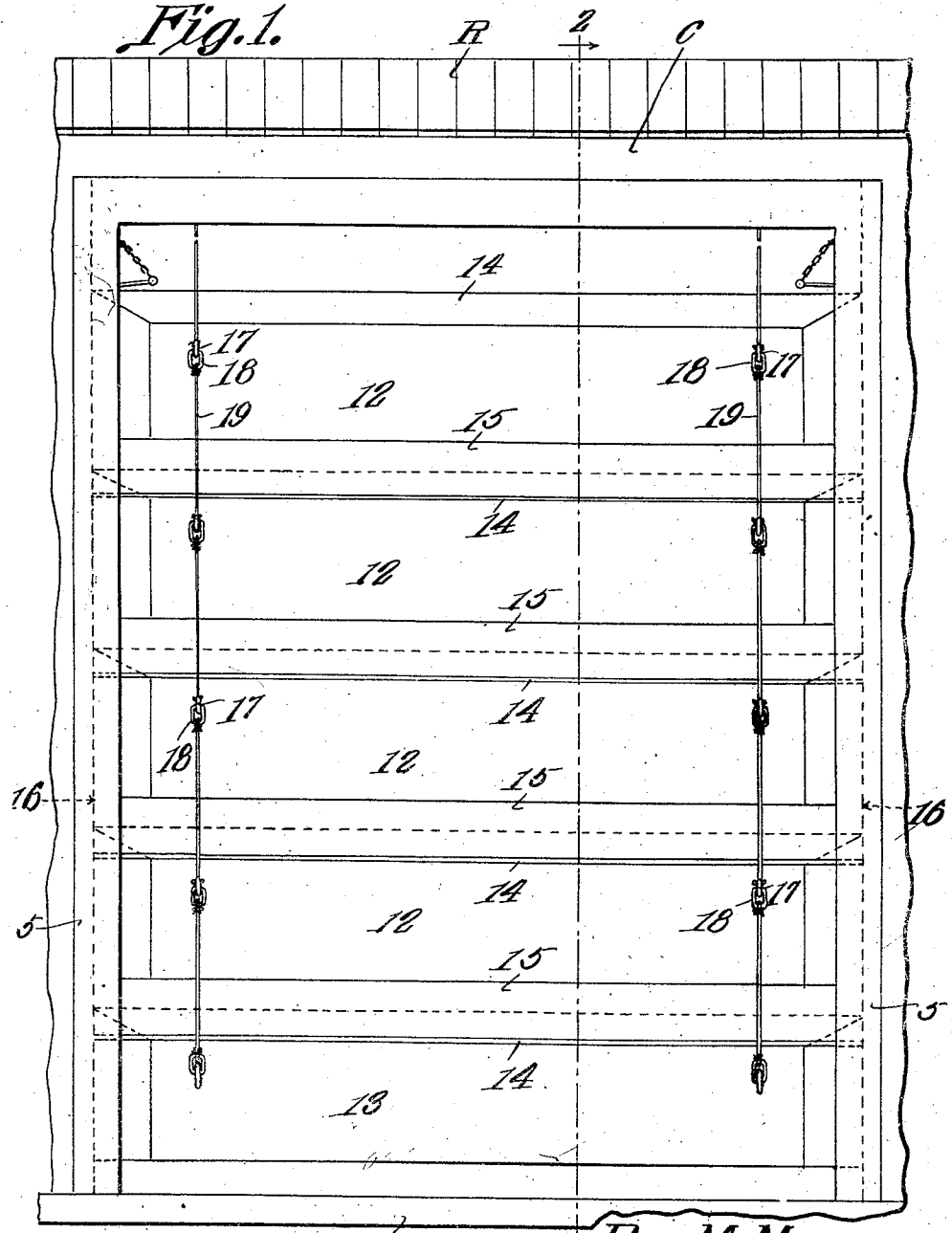

R. M. MOWRY.
CAR DOOR.
APPLICATION FILED MAR. 20, 1911.

1,033,115.

Patented July 23, 1912.

2 SHEETS—SHEET 1.

Witnesses

Roy M. Mowry,
Inventor by C. A. Snow & Co.
Attorneys

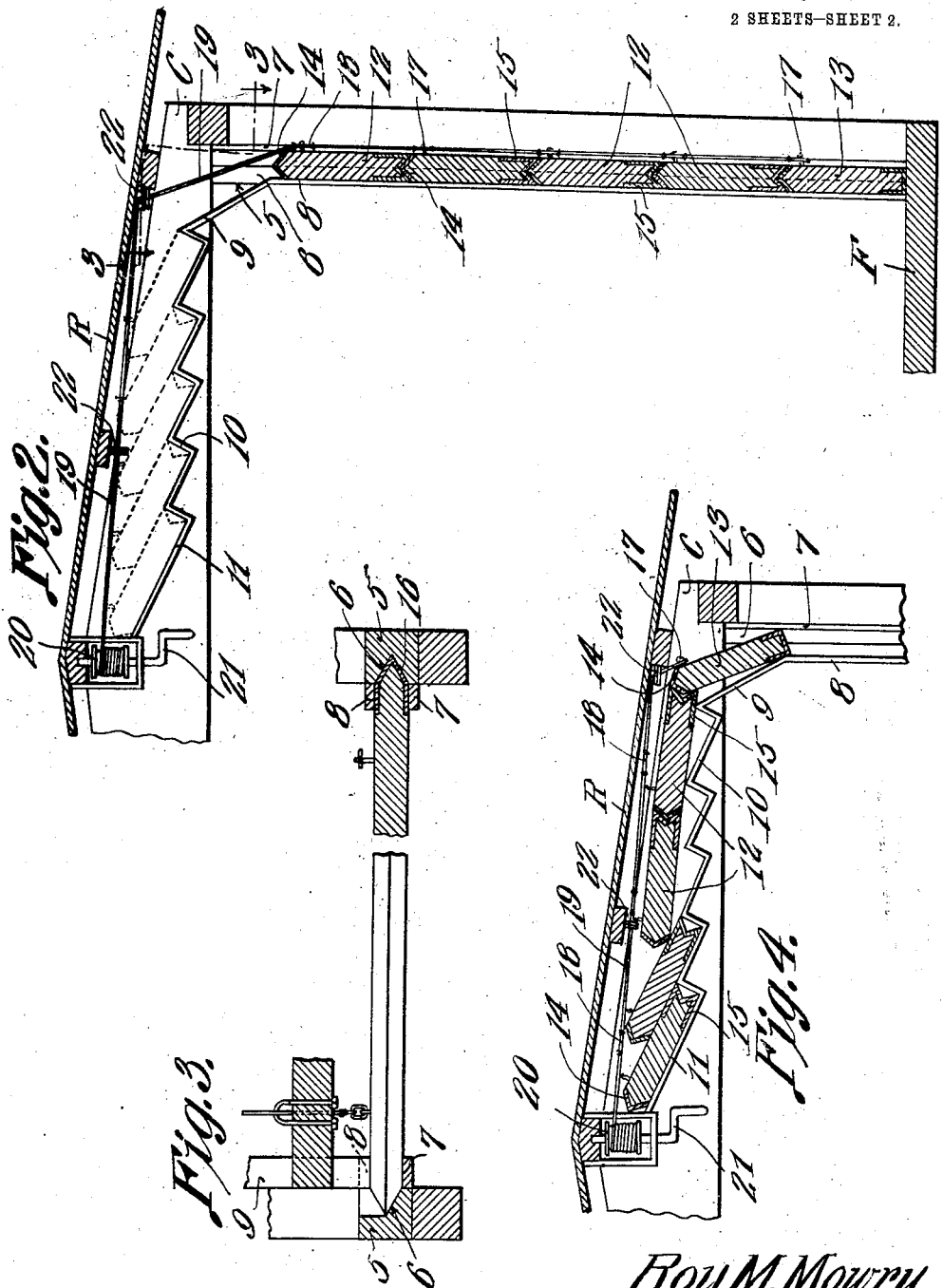

UNITED STATES PATENT OFFICE.

ROY M. MOWRY, OF NEZPERCE, IDAHO.

CAR-DOOR.

1,033,115.  Specification of Letters Patent.  Patented July 23, 1912.

Application filed March 20, 1911. Serial No. 615,680.

*To all whom it may concern:*

Be it known that I, ROY M. MOWRY, a citizen of the United States, residing at Nezperce, in the county of Nezperce and State of Idaho, have invented a new and useful Car-Door, of which the following is a specification.

It is the object of the present invention to provide an improved door for grain cars and the like and the primary aim of the invention is to so construct the door that it may be moved to position beneath the roof of the car and be entirely out of the way while the car is being unloaded.
The door embodying the present invention consists of a plurality of sections which may be independently moved to the position stated or, all of the sections may be simultaneously moved.
A further aim of the invention is to so construct the sections that they will have a tight fit in the doorway of the car and will also fit closely to each other so as to positively insure against escape of grain from the car.

In the drawings:—Figure 1 is a front elevation of the door embodying the present invention, the same being arranged in the doorway of a structure, such for example as a grain car. Fig. 2 is a vertical sectional view on the line 2—2 of Fig. 1 looking in the direction indicated by the arrow. Fig. 3 is a horizontal sectional view. Fig. 4 is a view similar to Fig. 1 illustrating the sections of the door partly elevated.

In the drawings, the car is indicated in general by the reference character C, the roof thereof is designated by the reference character R and the floor thereof by the character F. The side wall of the car is provided with the usual doorway and at each side of the doorway in the side of the car, there is arranged a guide 5 formed with a V-shaped groove 6. A track 7 is secured to each guide 5 at one side of the groove and terminating at a height substantially in alinement with the top of the door way, while a track 8 is secured to each guide at the other side of the groove therein, and extends rearwardly at its upper end as will presently appear. Each track 8, beyond its portion which extends along the guide 5, is bent inwardly and upwardly as at 9 and inwardly beyond this bent portion is stepped as at 10, the track terminating in an upwardly inwardly inclined portion 11 and the stepped portion of the track extending beneath the roof R of the car.

The door embodying the present invention consists of a number of sections 12 of like construction and a section 13 substantially like the other sections. Each section 12, as well as the section 13, has its upper edge beveled from the opposite faces of the sections whereby to assume an inverted V-form and is preferably covered with a strip 14 of sheet metal. Each section 12 has its under edge formed with a V-shaped groove and faced with sheet metal as at 15, the groove in the lower edge of each section 12 being arranged to receive the upper edge of the section next below, in the manner illustrated in Fig. 2 of the drawings, when the sections are in position to close the doorway in the side of the car. Section 13 has a rectangular lower edge and rests at its said edge upon the floor F of the car. When the sections comprising the door are in position to close the doorway, they are received, in superposed relation, between the tracks 7 and 8 and in order that grain will be prevented from sifting from the car around the ends of the doors, their said ends are beveled to V-form as at 16 and faced as in the case of their upper and lower edges, and fit snugly in the grooves 6 in the guides 5. It will be understood of course that the sections are slidable in these grooves and that they may travel over the track 8 so as to assume either the position shown in full lines or in dotted lines in Fig. 2 of the drawings. In order that the sections may be readily elevated, there is provided upon each of the sections, a pair of hooks 17 which engage in eyes 18 at intervals in the length of cables 19. These cables are trained through guides at the roof of the car and wind upon a drum 20 also mounted beneath the roof of the car and rotated through the medium of a crank handle 21.

In elevating the sections, the drum 20 is rotated so as wind up the cables 19 and as this is done, the sections will be simultaneously elevated or slid upwardly upon the track 8. It will be observed that the hooks 17 are nearly straight and consequently, as the sections move over the curved portions 9 of the tracks, the hooks will leave the eyes and the sections will be then advanced by the sections next below, upon which latter sections, or section, a pull is still exerted by the cables. As the sections advance over the stepped portions of the track, the foremost section will eventually ride up the inclined portion 11 of the two tracks and will finally drop into the position shown in dotted lines in Fig. 2 and in full lines in Fig. 4 of the drawings. This section then serves as an inclined plane upon which the next section in order, may move, in assuming a like position upon the stepped portions of the track. As stated, the cables are supported in suitable guides at the roof of the car and these guides are indicated by the numeral 22 and are constructed, in any suitable manner, to permit of the disengagement of the cables therefrom whereby the cables may be engaged with the sections of a door located at either side of the car.

What is claimed is:—

1. The combination with a structure having a doorway, of spaced tracks arranged within the structure, each of said tracks having a series of stepped portions extending beneath the roof of the structure, the stepped portions of each track alining, a plurality of door sections one to each stepped portion of each track movable upon the tracks and arranged to seat upon the respective alined pairs of stepped portions thereof in overlapped relation, and means for elevating the sections, said means comprising a cable having a plurality of eyes located at intervals in its length, and hooks upon the sections engageable in the eyes.

2. The combination with a structure having a doorway, of spaced tracks arranged within the structure, each of said tracks having a series of stepped portions extending beneath the roof of the structure, the stepped portions of each track alining, a plurality of door sections, one to each stepped portion of one track movable upon the tracks and arranged to seat upon the respective alined pairs of stepped portions thereof in overlapped relation, and means for elevating the sections, said means comprising a cable having a plurality of eyes located at intervals in its length, and hooks upon the sections engageable in the eyes, the said hooks being arranged to disengage from the eyes prior to movement of the sections over the stepped portions of the tracks.

3. The combination with a structure having a doorway, of guides located one at each side of the doorway and having V-shaped grooves, a pair of tracks disposed upon opposite sides of said guide, one of said tracks being longer than the other, and bent away therefrom and provided with a series of stepped portions, and a door consisting of a plurality of separate sections having V-shaped ends fitting slidably in the guides adapted to have its respective sections elevated to seat within the stepped portions of the track.

4. The combination with a structure having a doorway, of guides located one at each side of the doorway and having V-shaped grooves, a pair of tracks disposed upon opposite sides of said guide, one of said tracks being longer than the other and bent away therefrom and provided with a series of stepped portions, and a door consisting of a plurality of separate sections having V-shaped ends fitting slidably in the guides and having interfitting upper and lower edges and adapted to have its respective sections elevated to seat within the stepped portions of the track.

In testimony that I claim the foregoing as my own, I have hereto affixed my signature in the presence of two witnesses.

ROY M. MOWRY.

Witnesses:
T. J. HARDWICK,
R. J. MARTIN.